United States Patent
Branton (10) Patent No.: US 9,020,808 B2
(45) Date of Patent: Apr. 28, 2015

(54) DOCUMENT SUMMARIZATION USING NOUN AND SENTENCE RANKING

(71) Applicant: AppSense Limited, Warrington (GB)

(72) Inventor: Paul Keith Branton, Rochdale (GB)

(73) Assignee: AppSense Limited, Warrington (GB)

(*) Notice: Subject to any disclaimer, the term of this patent is extended or adjusted under 35 U.S.C. 154(b) by 223 days.

(21) Appl. No.: 13/763,864

(22) Filed: Feb. 11, 2013

(65) Prior Publication Data

US 2014/0229159 A1 Aug. 14, 2014

(51) Int. Cl.
- G06F 17/21 (2006.01)
- G10L 15/00 (2013.01)
- G06F 17/30 (2006.01)

(52) U.S. Cl.
CPC ................. *G06F 17/30719* (2013.01)

(58) Field of Classification Search
USPC ...................... 704/1, 9, 231; 706/45
See application file for complete search history.

(56) References Cited

U.S. PATENT DOCUMENTS

| | | | |
|---|---|---|---|
| 6,687,671 B2 | 2/2004 | Gudorf et al. | |
| 7,290,033 B1 | 10/2007 | Goldman et al. | |
| 8,266,218 B2 | 9/2012 | Keohane et al. | |
| 8,335,754 B2 * | 12/2012 | Dawson et al. | 706/45 |
| 2009/0254624 A1 | 10/2009 | Baudin et al. | |
| 2010/0077301 A1 | 3/2010 | Bodnick et al. | |
| 2014/0108005 A1 * | 4/2014 | Kassis et al. | 704/9 |

OTHER PUBLICATIONS

"Automatic summarization", http://en.wikipedia.org/w/index.php?title=automatic_summarization&printable=yes, printed on May 8, 2013, 13 pages.

"List of Formula One World Championship points scoring systems", http://en.wikipedia.org/w/index.php?title=list_of_formula_one_world_champion_point_scoring_systems&printable=yes, printed on May 8, 2013, 8 pages.

"Simple sentences", http://www2.elc.polyu.edu.hk/cill/sentence_structure.htm, printed on May 8, 2013, 3 pages.

"The Magical Number Seven, Plus or Minus Two", http://en.wikipedia.org/w/index.php?title=the_magical_number_seven,_plus_or_minus_two&printable=yes, printed on May 8, 2013, 4 pages.

* cited by examiner

*Primary Examiner* — Charlotte M Baker (74) *Attorney, Agent, or Firm* — Wilmer Cutler Pickering Hale and Dorr LLP (57) ABSTRACT

Systems and methods are provided for summarization of electronic text documents. Nouns and sentences are identified in a text document, and the most-prevalent nouns are further identified based on frequency. The sentences in the document are scored based on assigning points based on cumulative presence or absence of each of the most-prevalent nouns. A tag cloud consisting of the most-prevalent nouns is displayed together with the highest-scoring sentences, thereby providing context for the nouns in the tag cloud.

18 Claims, 5 Drawing Sheets

DOCUMENT SUMMARIZATION USING NOUN AND SENTENCE RANKING

BACKGROUND

When examining documents that are stored on a computer system, automatic summarization is a name given to the process of reducing a text document to a shorter text document, while retaining the most important points of the original document. Automatic summarization can be a useful tool for providing information about the contents of a document at a glance, without requiring a user to review the document in depth.

Various techniques exist for performing automatic summarization, including linguistic and non-linguistic techniques. In recent years, text processing algorithms have advanced to the point where a computer system can be used to parse natural-language sentences and determine the structure of the sentence. Techniques that incorporate these technologies are typically called linguistic techniques. Linguistic techniques commonly involve understanding different parts of speech that appear in a document, such as nouns, verbs, and adjectives. Linguistic techniques also can use a priori information about the relative frequency of words in a given language. By using such techniques, it is possible to provide, for example, a list of words that are unusual in a document. However, linguistic document summarization techniques have a number of downsides. For example, when identifying common words, many words in a document are highly-common "stop words," such as the word "the" in English, that do not add meaning. Removing stop words requires maintaining a cumbersome blacklist.

Linguistic document summarization can be further subdivided into supervised and unsupervised techniques. Supervised techniques involve the use of test documents to train or teach rules to the engine prior to first use. Unsupervised techniques are those where no pre-learning is required. Complex algorithms can be used in both cases to collect significant sentences and then weight the sentences accordingly. This complexity can make supervised or unsupervised linguistic document summarization inappropriate in situations where computing power is limited.

It is possible to provide a document summary without linguistic analysis. For example, several common email clients, including Google GMail and Microsoft Outlook, provide a short "snippet" when displaying an email. The snippet is typically comprised of the first few characters or sentences of the email. This approach provides information to the user without requiring extensive computation. However, this approach typically fails to provide information about the entirety of the contents of the document or email, and is limited to giving information about the first few sentences.

There is, therefore, a need for a document summarization system that, for example, overcomes the drawbacks above.

SUMMARY

Embodiments of the disclosed subject matter relate to systems, methods, and non-transitory computer-readable media for providing a method of summarizing documents.

In one embodiment, a computerized method is disclosed for providing a summary of a text document, including identifying at least some nouns and sentences in the text document, counting the number of times the identified nouns appear in the text document for at least some of the identified nouns, identifying a predetermined number of most-prevalent nouns based on the number of times the identified nouns appear in the text document, scoring each of the identified sentences as a function of the number of times the predetermined number of most-prevalent nouns occurs therein, displaying at least some of the predetermined number of most-prevalent nouns, wherein the size of each displayed noun can be a function of the number of times the displayed noun appears in the text document, and displaying a predetermined number of the scored sentences that have the highest scores, the displayed scored sentences being displayed in proximity to the displayed nouns.

The scoring scheme can further include, for a given sentence, identifying each of the identified nouns that are in the sentence, for each identified noun, identifying a score value to be added, adding each of the score values for each time each identified noun is in the sentence to the score for the sentence, and dividing the score by the average number of words of all sentences in the text document, thereby normalizing the score over differing sentence lengths. Identified sentences that contain fewer words than a minimum word threshold can be discarded. The minimum word threshold can be six words. The displayed nouns and the displayed sentences can be sent to a mobile Internet device. The displayed nouns can be displayed in a tag cloud. The most-prevalent noun can be placed in the center of a tag cloud. Case-insensitivity and stemming can be used to identify the nouns and sentences. The predetermined number of scored sentences to be displayed and the predetermined number of most-prevalent nouns to be displayed can be configurable. Three scored sentences and nine identified nouns can be displayed in the displayed nouns and the displayed sentences.

In another embodiment, a computing system is disclosed that includes a processor, and a memory coupled to the processor and including computer-readable instructions that, when executed by the processor, cause the processor to identify at least some nouns and sentences in the text document, count the number of times the identified nouns appear in the text document for at least some of the identified nouns, identify a predetermined number of most-prevalent nouns based on the number of times the identified nouns appear in the text document, score each of the identified sentences as a function of the number of times the predetermined number of most-prevalent nouns occurs therein, display at least some of the predetermined number of most-prevalent nouns, wherein the size of each displayed noun can be a function of the number of times the displayed noun appears in the text document, and display a predetermined number of the scored sentences that have the highest scores, the displayed scored sentences being displayed in proximity to the displayed nouns.

The processor can, for a given sentence, identify each of the identified nouns that are in the sentence, for each identified noun, identify a score value to be added, add each of the score values for each time each identified noun is in the sentence to the score for the sentence, and divide the score by the average number of words of all sentences in the text document, thereby normalizing the score over differing sentence lengths. The processor can discard identified sentences that contain fewer words than a minimum word threshold. The minimum word threshold can be six words. The computing system can also include a mobile Internet device for displaying the displayed nouns and the displayed sentences. The processor can display the displayed nouns in a tag cloud. The processor can display the most-prevalent noun in the center of a tag cloud. The processor can use case-insensitivity and stemming to identify the nouns and sentences. The predetermined number of scored sentences to be displayed and the predetermined number of most-prevalent nouns to be displayed can be configurable. Three scored sentences and nine identified nouns can be displayed in the displayed nouns and the displayed sentences.

Various aspects of the disclosed subject matter can provide one or more of the following capabilities: summarizing documents more efficiently than prior techniques; displaying a document summary in a simple and efficient manner; providing a document summary that includes context as well as key terms from the document; displaying a document summary that includes a tag cloud and sentences excerpted from the document.

These and other capabilities of the disclosed subject matter will be more fully understood after a review of the following figures, detailed description, and claims.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the disclosed subject matter.

Techniques are disclosed herein for summarizing documents. For example, an e-mail or document can be sent to a user on a smartphone. Because the screen of the smartphone is typically very small, only a small preview of the e-mail or document may be displayed to the user. The techniques described herein can be used to display the most relevant portion of the e-mail or document to the user in the preview, including displaying a series of words from the document and also displaying those words in context.

The techniques used to summarize a document can incorporate elements of both linguistic and non-linguistic summarization techniques, and additionally can have the advantage that they can provide a rapid overview of an entire document—one that is not limited to presenting just the first few sentences of a document. The document summarization system can include presentational aspects and computational aspects, which can be combined in a summary view that presents the most-frequent nouns in the document together with the most highly-ranked sentences in the document.

Figure 1:
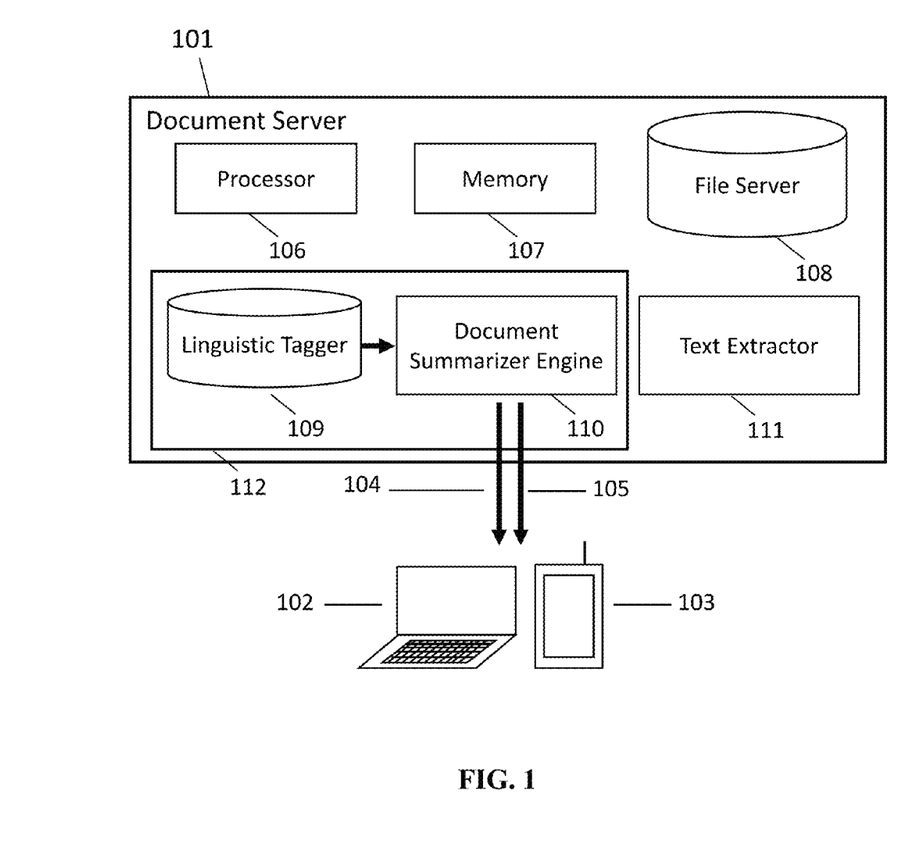
FIG. 1 is an exemplary schematic diagram of a document summarization system.

FIG. 1 is a schematic diagram of an exemplary document summarization system. Document server 101 includes a processor 106, a memory 107, a file server 108, a linguistic tagger 109, a document summarizer engine 110, and a text extractor 111, all of which can be interconnected with one another. Document server 101 can provide services to one or more client users over, for example, the Internet, over a private network or VPN, or via a firewalled or secure connection that permits users on the public Internet to authenticate for access. Document server 101 can be incorporated into, or can be part of, a general file server, a file sharing system, a content repository, or other storage system. Document server 101 can be connected to one or more client devices, which can include a personal computer 102 and/or a smartphone 103. Document server 101 can be connected to these client devices via the Internet, or other network. Personal computer 102 can be, for example, a laptop, desktop, workstation, server, thin client, other network client or other device. Smartphone 103 can be, for example, an Apple iOS-based smartphone, an Android-based smartphone, or other smartphone. Smartphone 103 can also be any other network terminal or network-enabled device. These devices can provide summaries of documents by virtue of their connection with document server 101. Personal computer 102 and smartphone 103 each, or both, can receive a tag cloud 104 (described more fully below) and a set of summary sentences 105 (also described more fully below). Linguistic tagger 109 and document summarizer engine can be within the same logical module, as shown by logical module 112, and/or can be located elsewhere.

Processor 106 can execute instructions that are stored in memory 107, and that enable the processor to facilitate document summarization or perform some or all of the steps of document summarization. Processor 106 and memory 107 can also be responsible for running an operating system for document server 101. File server 108 can store files to be summarized using the server 101. File server 108 can be a Common Internet File Service (CIFS) file server, a Network File Server (NFS) file server, a local document store or file system, or any other file server as is commonly known in the art. File server 108 can also be a remote or network-based file server, in which case module 108 is not itself part of the document server, but instead is a network client for the file server itself that communicates with the document server. File server 108 can also be a client to a cloud-based file storage system, such as Dropbox (TM). File server 108 can provide files to be summarized, and can send those files to the text extractor 111, the linguistic tagger 109, directly to the remote user using the smartphone 103 or personal computer 102, or elsewhere.

The files to be summarized can be processed by the text extractor 111 before they are summarized. For example, the text extractor 111 can accept documents as input, such as those from file server 108. Text extractor 111 can extract text from documents, even when those documents do not contain machine-readable text. Examples of documents from which text extractor 111 can extract text include: portable document format (PDF) documents, including PDF documents that consist mainly or entirely of images; images, such as Joint Photographic Experts Group (JPEG)-compressed files; Microsoft Word documents; emails or email mailboxes; damaged documents of any type, including the above types; metadata of any of the foregoing; and other files. In some embodiments, text extractor 111 can perform optical character recognition (OCR) in order to extract text. In some embodiments, text extractor 111 may not be needed to process a document before starting summarization. Text extractor 111 can be a remote or network-based document processing system, or can be integrated with a remote service to provide its functionality.

Linguistic tagger 109 and document summarizer engine 110 can provide functionality relating to summarizing of documents. Linguistic tagger 109 can accept as input documents containing text and review the text inside those documents in conjunction with a priori knowledge about the language used by the text, and can perform linguistic analysis of the text. The documents containing text can be the documents preprocessed by the text extractor 111. Linguistic tagger 109 can perform linguistic analysis based on dictionaries of known words and parts of speech thereof, or based on analysis of word order or sentence construction. Linguistic analysis can result in information about parts of speech for each word in the document, and can also provide information about sentences such as where sentences are delimited. Linguistic analysis can use, for example, dictionaries, pre-encoded information about existing corpora of data, statistical information about documents written in a particular language, or other sources for providing information. Information about words in the document can be associated via links to those words, thereby "tagging" those words with additional information, in some cases. One exemplary linguistic tagger is the linguistic tagger built into Apple iOS and Mac OS.

Document summarizer engine 110 can accept the output of the linguistic tagger 109, in some cases. Document summarizer engine can contain additional functionality, which is described below. The output of document summarizer engine 110 can be a tag cloud 104 and the set of summary sentences 105, which can be sent to personal computer 102 and/or smartphone 103 via a network interface, local interface, or other interface. A tag cloud is generally a visual presentation of words wherein the words are given differing sizes according to the value of a numeric parameter. Description of tag cloud 104 is provided in more detail with respect to FIG. 2. The interface of personal computer 102 and/or smartphone 103 is further described with respect to FIG. 5.

When preparing document summaries, an analogy may be made to Formula I racing scores. Scores are applied only to nouns (which are analogous to "drivers") and sentences ("races") are scored based on the number of "drivers" present in each "race." Long sentences have the score modified ("handicapped") so that they do not skew the results. The "drivers" are all single words so they are displayed in a tag cloud to show both their presence and their frequency. The top 3 "races" as displayed in full so that although their context in relationship to other "races" is not maintained, the context within them is present in full. The specific method is described in further detail below.

Figure 2:
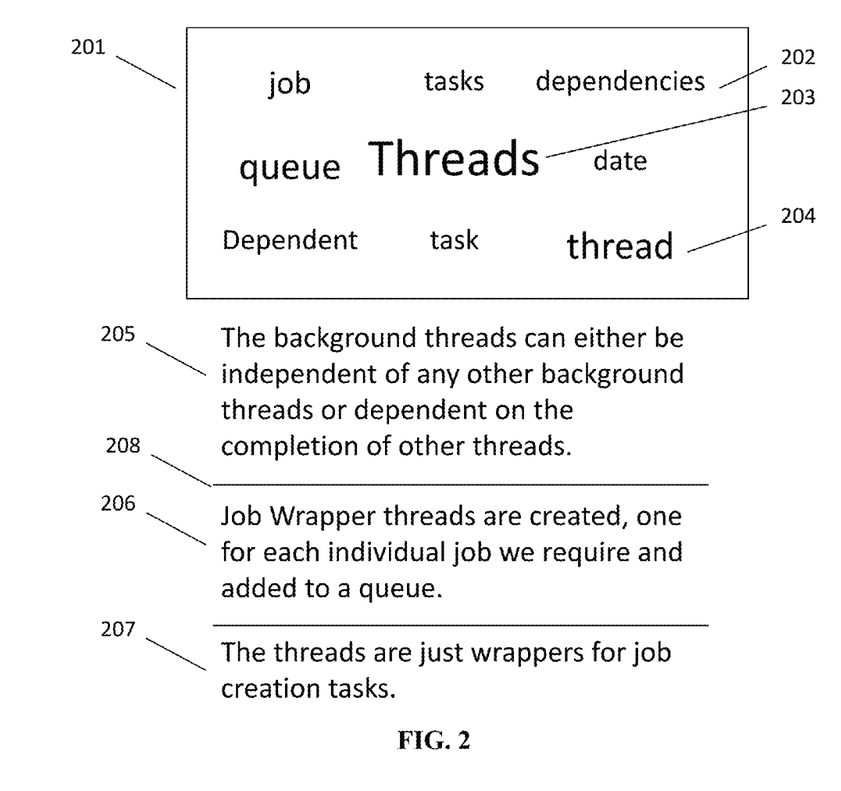
FIG. 2 is a representative layout of an exemplary document summary presentation.

FIG. 2 is a representative layout of an exemplary document summary presentation. Summary tag cloud 201 can contains various terms 202, 203, 204, each with sizes that reflect the value of an underlying parameter. The underlying parameter can be the number of times a term appears in the document being summarized. The specific size selected for the terms can be related to the numeric value of the parameter according to an arbitrary relationship, or a linear or non-linear mathematical relationship. The terms are displayed in an order that can be representative of a second underlying parameter, such as an alphabetical ordering, or can be displayed without a specific ordering but instead based on a visual layout algorithm or heuristic that allows the terms to be displayed in an aesthetically-pleasing, non-overlapping, and/or visually-balanced manner. In the layout shown, term 203 has the largest size and is placed at the center of the tag cloud. Each of the terms is a noun that has been extracted from the document being summarized. A sample document has been summarized to produce this figure.

Summary tag cloud 201 can be implemented on a variety of operating systems and platforms using a variety of techniques, including one or more of: hypertext markup language (HTML), cascading style sheets (CSS), structured general markup language (SGML), PostScript, Portable Document Format, TeX/LaTeX, Apple Quartz, Apple iOS, Apple Mac OS X, Microsoft Windows, Microsoft DirectX, Google Android, or another platform. In some embodiments, tag clouds can offer advantages, such as low processing requirements, due to their simple visual presentation. This allows tag clouds such as tag cloud 201 to be used on devices with limited processing power, such as smartphones, mobile devices, or other miniature devices.

Summary tag cloud 201 can incorporate terms derived from the original source document by linguistic tagger 109 and output by document summarizer 110. In some embodiments, the layout, including term size, and term order can be controlled by document summarizer 110; in other embodiments, either layout or term order can be controlled by another module.

Summary tag cloud 201 typically includes only nouns, although other grammatical parts of speech can also be included. The use of only nouns as terms for the tag cloud can result in the automatic elimination of common stop words such as "a," "an," or "the." Scoring based on only nouns also has an increased likelihood of being based on information that is unique to or specifically characteristic of the document being summarized, and also have an increased likelihood that a user will be able to identify the subject matter of the document at a glance. As an example, two magazine articles that provide information about two disparate topics, such as golf and politics, will contain different strings of nouns, such as "Pebble Beach," "tournament," and "fairway," which are relevant to golf, and "election," "pundit," and "Democrat," which are relevant to politics. Even when common terms, such as "club" and "driver," appear that are common to both topics, the presence of other unique terms can alert the user to the specific subject or topic of the document. This technique can be applied to all languages that use nouns.

While this disclosure discusses the selection and use of nouns, it is not limited as such. For example, other parts of speech can be identified and used for summarization, such as verbs, adverbs, adjective, prepositions, subjects, predicates, etc. As well, nouns and verbs can be combined. As well, multiple parts of speech can be used in combination, including any combination thereof.

Additionally, summary tag cloud 201 can contain the top nouns in the document. These nouns can be identified by the method described more fully below, and thus can provide the most significant key words out of the document. In some embodiments, a frequency-based method of identifying key terms can be used; such an embodiment is described below. In still other embodiments, other methods may be used for identifying key terms, as are known in the art.

Summary tag cloud 201 can contain nine terms. In some embodiments, this number can be larger or smaller. In a preferred embodiment, the number of terms can be limited to seven terms plus or minus two terms, which is a number that is widely recognized in psychology to be approximately the limit of human short term memory. In some embodiments, the terms can be displayed with formatting that reflects or mirrors the formatting of those terms in the original source document. Additionally, in some embodiments, all nouns can be treated separately based on case-insensitive string matching. However in other embodiments, nouns from the same stem word can be grouped together, such as plurals of the same noun ("stemming").

Continuing on in FIG. 2, document summary sentences 205, 206, 207 are also shown in conjunction with, and adjacent to, the terms in tag cloud 201. Each of these sentences are sentences that can appear in the original source document, and may have been identified by the method described herein to be one characterization of the contents of the document. The sentences can be of differing lengths. The sentences can be displayed in the same order they appear in the original document, or they can be reordered. In some embodiments, the sentences can be displayed with formatting that reflects or mirrors the formatting of those sentences in the original source document. In some embodiments, a delimiting feature, such as line 208, can be used to distinguish the sentences from each other; in other embodiments, delimiters may be absent.

While the nouns displayed in summary tag cloud 201 show specific words that are the key words of the document, document summary sentences 205, 206, 207 can provide information in context. Instead of identifying sentences based on their meaning, some embodiments of the invention can use a numerical weighting technique such as that described below. Because of the method used to identify the key sentences, it is likely that the terms in summary tag cloud 201 will appear in the sentences selected as key sentences. This can allow a user to determine which of several possible meanings each of the terms has in the document, or in different parts of the document.

FIG. 2 shows three sentences, because this provides a sufficient level of coverage to handle multiple parts of a long document, in some cases, while being short enough to be presented in a simple, visual way. This is in contrast to the non-linguistic summarization technique often used for email of presenting the opening sentence or sentences in a document, which provides coverage only of the first part of the document. Depending on the specific presentational requirements and on the source documents being summarized, however, more or fewer sentences may be used. The scoring system is designed such that it is likely that the nouns in the tag cloud appear in one or more of the sentences, thereby providing a context-rich way of understanding the nouns in the tag-cloud. In some embodiments, the user can be enabled to choose how many sentences to display, and/or how many nouns to display in summary tag cloud 201.

Figure 3:
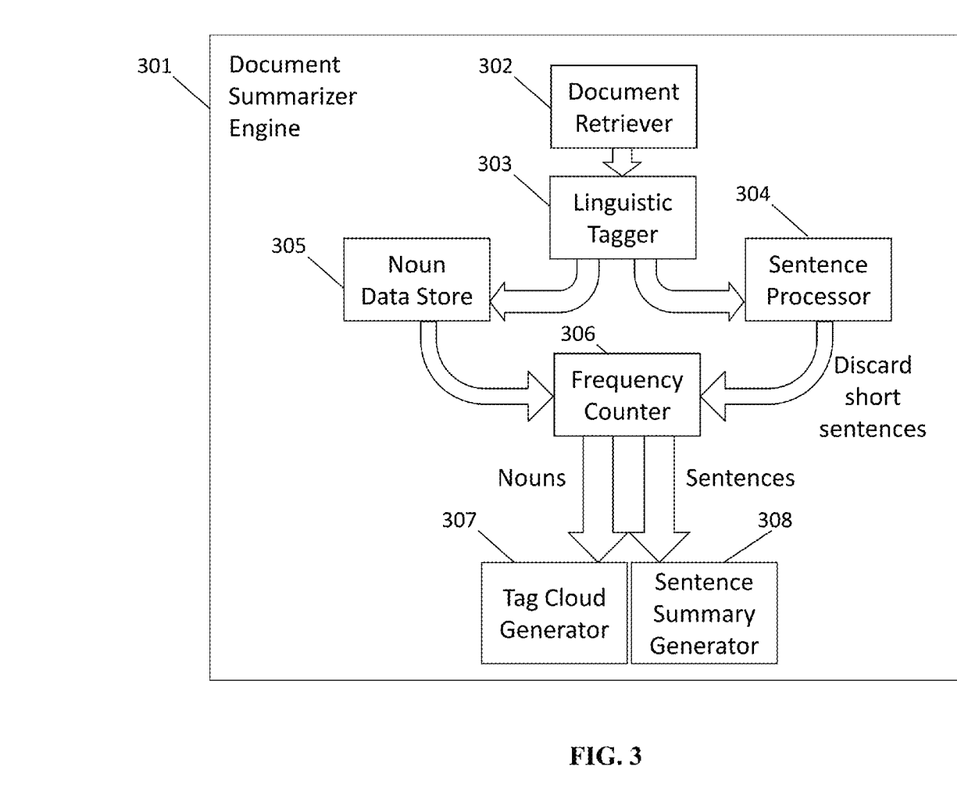
FIG. 3 is a block diagram of an exemplary document summarizer engine.

FIG. 3 is a block diagram of an exemplary document summarizer engine. Document summarizer engine 301 can include document retriever 302, linguistic tagger 303, sentence processor 304, noun data store 305, frequency counter 306, tag cloud generator 307, and sentence summary generator 308, or can include different components or a different ordering of components, in some embodiments. Document retriever 302 can perform one or more of the following functions: identifying and retrieving a document from a stored location for summarization; performing preprocessing operations on a document, such as optical character recognition (OCR) for preparing text in a document to be processed; and downloading a document from a remote location, server, or cloud storage location. Document retriever 302 can output the retrieved document to linguistic tagger 303.

Linguistic tagger 303 can be responsible for receiving the input from document retriever 302 and performing linguistic analysis, which can include one or more of the following operations: identifying parts of speech for words in the document; identifying sentences and sentence boundaries in the document; and creating data structures embodying linguistic data about the document and contents of the document. Linguistic analysis can include stemming, frequency analysis, Markov modeling and analysis, or other types of analysis. Once linguistic analysis is complete, some or all of the output of linguistic tagger 303 is passed to both sentence processor 304 and noun data store 305. Any linguistic analysis engine can be used. Linguistic analysis may include one or more steps, such as parsing, lexing, stemming, part-of-speech tagging, and other steps. Linguistic analysis may also include semantic analysis of the particular words and phrases that appear in the document. Preferably the linguistic analysis engine provides sentence identification and noun identification, further implementation details regarding these steps are not presented herein. The output of linguistic tagger 303 can be a dictionary or dictionary data structure.

Sentence processor 304 can perform various steps, as is described below, to identify sentences and determine their length. Sentence processor 304 first receives the whole document for summarization, augmented by some or all of the output of linguistic tagger 303. In order to permit scoring that is adjusted based on the length of the sentence, the length of each sentence is counted. In one embodiment, sentence scores are normalized by length by dividing by the average length of all sentences in the document. As shorter sentences have scores that are potentially higher in this averaging scheme, sentences of five words or less are discarded in some embodiments, such that only sentences with six or more words are used. This number is configurable, in some embodiments. The output of sentence processor 304 is sent to frequency counter 306.

Noun data store 305 can include a list of nouns arranged in a data store that contains key-value pairs, and can be an associative array, and can contain other arbitrary data from the output of the linguistic tagger 303. Noun data store 305 can be a dictionary data structure, where the dictionary data structure stores a listing of nouns in the document and is not necessarily a dictionary data structure containing arbitrary words, a list of all nouns, or all words in the English language. Noun data store 305 can receive the whole document for summarization, augmented by some or all of the output of linguistic tagger 303. Noun data store 305 can then use the output of linguistic tagger 303 to list the nouns in the document. Once the nouns are listed, the list of nouns can be sent to frequency counter 306.

Frequency counter 306 can receive the output of both sentence processor 304 and noun data store 305, and can count the frequency of the nouns in the noun data store 305. Once the nouns are counted, frequency counter 306 can be enabled to rank the nouns. Once the nouns are ranked, the sentences can be ranked as well by examining each sentence, searching for each or any of the top-ranked nouns, and then adding a word score number that corresponds to the ranking to a sentence score, or via an alternative ranking method, as described elsewhere herein. In some embodiments, the number of top nouns is configurable; in other embodiments, there are 9 top nouns.

At the end of the operations performed by frequency counter 306, frequency counter 306 can output a list of nouns, which have been selected, ordered, and ranked, and optionally a set of values of another parameter, to tag cloud generator 307. Frequency counter 306 can also output a list of sentences, which have been scored according to the algorithm above, or by any other algorithm, to the sentence summary generator 308.

Tag cloud generator 307 can receive a list of nouns, together with an optional set of values of a parameter. Examples of parameters are described further herein, and may include a number of times that a noun appears in the document. Tag cloud generator 307 can take the list of nouns and create a tag cloud by assigning each of the words a size and a position, and by performing rendering steps necessary to place the words in that size and position in the tag cloud. Tag cloud generator 307's optional parameter can be used to assign the size or order. Tag cloud generator 307 can also use the order assigned by frequency counter 306. The generated tag cloud can be passed on for output to a user-facing device. The summary tag cloud 201 is a representative generated tag cloud.

Sentence summary generator 307 can receive the sentences ranked by frequency counter 306, as well as optionally the value of a parameter as well. Sentence summary generator can take the received sentences and summarize them by identifying, ordering, and presenting the sentences for output to a user-facing device. The document summary sentences 205, 206, 207 are representative sentences.

Figure 4:
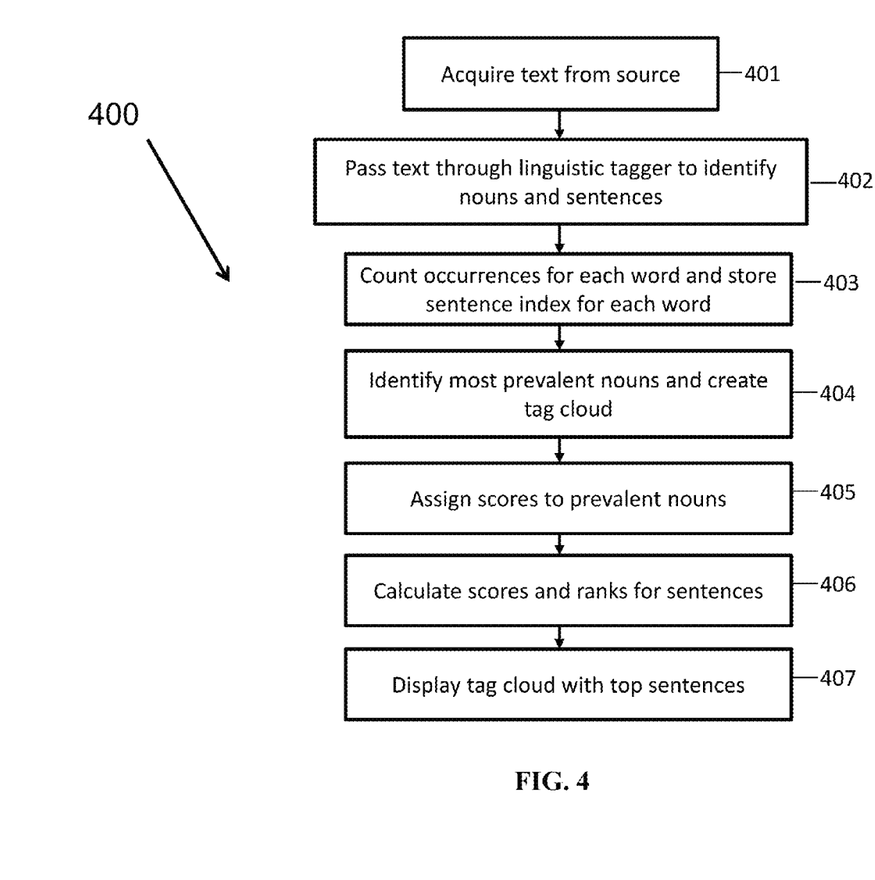
FIG. 4 is a flow diagram of an exemplary method for summarizing documents.

In operation, referring to FIG. 4, with further reference to FIGS. 1 and 3, an exemplary process 400 for summarizing documents using the system 101 includes the steps shown. The process 400, however, is exemplary only and not limiting. The process 400 can be altered, e.g., by having steps added, removed, altered, or rearranged.

At step 401, text can be acquired from a source. The text can be requested by the processor 106 from the file server 108 or the text extractor 101, and/or can be pushed to the memory 107, and/or can be performed as a separate process by document retriever 302. The process of acquiring a text from a source can involve a conversion process such as converting Portable Document Format (PDF) documents, Microsoft Word documents or other documents to text, or extracting the body text and/or header text from emails. Email header text can include the subject and/or subject line of an email, as well as the date, sender, carbon copy (CC), blind carbon copy (BCC), recipient information, and/or other information.

At step 402, the extracted text can be passed through a linguistic tagger to identify parts of speech and sentence boundaries. Some or all of the words can be classified by their type (e.g., noun, verb, adjective, adverb, stop word, etc.). This can be accomplished by linguistic tagger 109, 303. Every sentence can also be identified by a number, or index, which can represent the order of the sentence in the paragraph, and which can be stored together with a reference to a character string or other digital representation of the sentence in memory or on disk, or in any other storage media. For example, the first sentence in a document could be represented using the number "0," and a reference to the actual words in the sentence to a location on disk; the second sentence in a document could be represented using the number "1," and a reference to the words in the second sentence in a memory location, and so on. This number is referred to as the sentence index.

In some embodiments, an assumption can be made that sentences containing a majority of speech types (verbs, nouns, adjective and adverbs, etc.) are of interest. For example, a short sentence, like "I go." is unlikely to contain enough information to summarize the document. Accordingly, sentences that are less than six words long can be removed from consideration.

At step 403, the total number of occurrences of each word can be tallied by processing each sentence in the document, and incrementing an occurrences value. Each time the given word is found in a sentence in the document, the sentence index for the word (the number of the sentence when the sentences in the document are sorted in the order they appear in the document) can be stored together with the word in the noun data store 305, such that at the end of tallying the occurrences for each word, each word can be stored together with a list of all the sentences within which the word was found in the document. Words can be dealt with as case-sensitive or -insensitive.

At step 404, using the number of occurrences developed at step 403, the 10 most prevalent nouns can be identified. The top 9 nouns can be assigned to be drawn as a cloud tag image using the number of occurrences to control the font size.

At step 405, the nouns can be given scores of 10 down to 1, with 10 points being awarded to the most-prevalent noun. Other functions can be used to assign numerical scores to the nouns. For example, the most-prevalent noun can receive the highest score, nouns can be scored according to their semantic value, their distinctiveness, their relative rarity within a particular language or subject domain, or other functions. In some embodiments, scoring can be performed using multiple parameters in combination, or some additive combination of any of the above with frequency.

At step 406, for each of the top 10 nouns, the sentences they occur in can be awarded points based on the score of the noun. Sentences with multiple nouns will receive multiple points. In some embodiments, another number of nouns can be used for either the most prevalent nouns, or for the number of nouns presented in the tag cloud. In some embodiments, nouns that occur more than once in a sentence can receive a reduced amount of points for the second and subsequent appearances within that single sentence.

A modifier can be calculated as follows. The sentence length can be divided by the average sentence length (this can be pre-computed using a rolling mean calculation during the initial sentence processing). If less than 1, the modifier is adjusted to 1. The score for the sentence is divided by this modifier. This step can be called normalization. This provides a handicap for longer sentences to stop their scores from dwarfing shorter, more eligible, sentences. The sentences can be ranked based on their scores, and in certain embodiments, the top three sentences can be chosen.

A specific example of frequency data is provided below. In the below example, the corpus of text used is a document about computer multiprocessing techniques using threaded programming. In the below example, frequency data (e.g., the number of times the word appears in the document) is shown in parentheses, and the sentence score is shown both as the total score and the handicapped score, shown as: (total score: handicapped score). When scoring sentences, a noun in position 1 can be worth 10 points, with the number of points decreasing with each position, down to position 10 being 1 point.

Noun Frequency Data:
1 (29)=THREADS
2 (10)=JOB
3 (8)=DEPENDENCIES
3 (8)=DEPENDENT
5 (7)=THREAD
6 (6)=TASK
6 (6)=DATA
6 (6)=QUEUE
6 (6)=TASKS
10 (5)=USER Sentence Scoring Data
1 (38:33.347): The background threads can either be independent of any other background threads or dependent on the completion of other threads.
2 (33:33.000): Job Wrapper threads are created, one for each individual job we require and added to a queue.
3 (24:24.000): The threads are just wrappers for job creation tasks.

Figure 5:
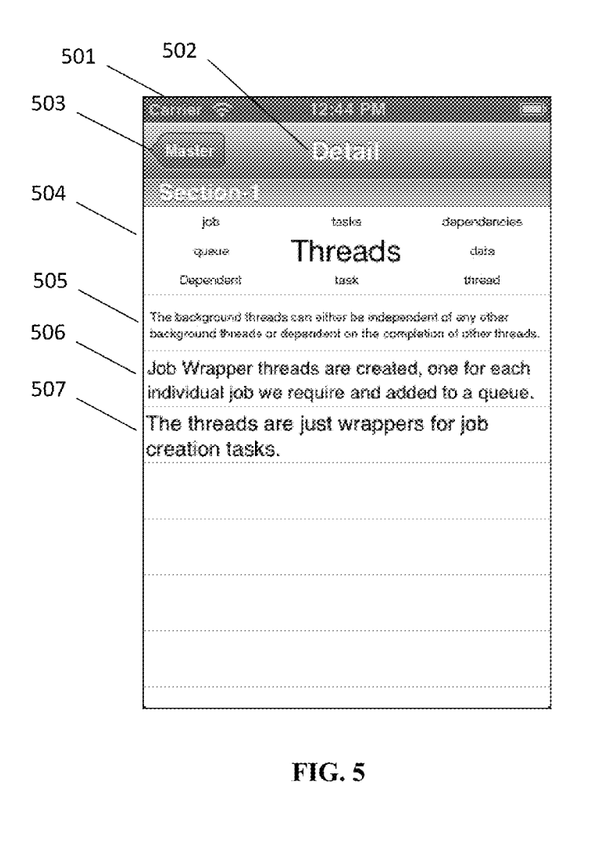
FIG. 5 is a rendering of an exemplary document summary presentation on a smartphone.

FIG. 5 is a rendering of an exemplary document summary presentation on a smartphone. In some embodiments, one or more documents can be summarized, either at a smartphone, at a server, or at another location. These documents can be presented in summary form at a user terminal. The user terminal can be, for example, a computer, a smartphone, or other device.

Header 501 shows cell phone carrier, signal strength, time, and battery indicators that are typically part of the smartphone user interface. Title 502 can reflect the content of a document summary presentation for a given document. Title 502 can contain an indication that the document is presented in summary form. Title 502 can also contain an identifier of the document, such as the document title. Button 503 provides an interface that can allow the user to access other documents and summaries thereof, in some embodiments.

Tag cloud 504 shows nine nouns. The nouns are shown with a size that is dependent on a parameter. The parameter can be, for example, the number of times that the nouns occur in the document. Sentences 505, 506, 507 are three sentences that are excerpted from the document, as described above. Tag cloud 504 and sentences 505, 506, 507 are presented on the same screen, although this is not required.

A document summary presentation such as described above with respect to FIG. 5 can be part of a document management system that permits access to a number of documents or a document store via a server located in the cloud, or on the Internet, or on a corporate intranet, or via a virtual private network (VPN), or elsewhere. Such a document management system can incorporate a file window as described above can show files on a server, and the server can allow users to access the summary of a document as a way for the users to identify whether or not to download a document. Alternatively, emails can be presented to the user in this summarized way. Alternatively, a file window on a desktop can be presented which shows a summary of an entire directory worth of files. This summary could be prepared by performing the above process of document summarization on the concatenated file text of all files in the directory. Alternatively, this method can instead provide multiple summaries in a particular order, or can use the thumbnail method described below to provide a large number of summaries that are easy to see.

In use, a smartphone user could browse his or her remote file store on the server, and each time the user selected a summary view, the summary view shown in FIG. 5 for the appropriate file could be shown. Alternatively, the user can view a local file store or directory. The user could use the system to summarize all documents in a directory at once. As documents are added to the file store, the server can automatically summarize the new documents according to the method described herein. The user can, in some embodiments, request a file to be retrieved from the server and downloaded to the user's smartphone by requesting the summary and not by requesting the file by filename.

In an alternative embodiment, formatting information can be used and/or preserved when creating document summaries. During the process of extracting text from a document, the process can discard valuable or relevant information. For instance, words in bold and titles and words in larger font sizes are likely to be more important than words lacking such formatting. When formatting information is taken into account, the available formatting can be transformed into a number that can constitute an additional parameter for use during the scoring of nouns. In some cases, the additional parameter can be added to the noun count parameter described above; in other cases, the additional parameter may be considered separately from the noun count parameter. Further, in some cases, the formatting can be directly applied to the words that appear in the tag cloud or the sentences selected for display in the document summary presentation. For example, words that are in bold in the original document can be presented in bold in the tag cloud.

In a further alternative embodiment, different colors or formatting can be used for nouns based on their scoring. These colors and formatting can be used in the summary sentences as well as in the summary tag cloud.

In a further alternative embodiment, file metadata can be used for summarization, such as: document creation date, document edit date, filename, file type, file path, access permissions, and other information. Metadata such as a list of editing users or document accessors, dates and times of edits can also be used. If a document resides in a document management system, additional metadata can be available, such as client name, matter name, user-supplied tags, private or published status, and other metadata. In one embodiment, metadata can be supplied in conjunction with the summary tag cloud and summary sentences. In another embodiment, metadata can be incorporated into the tag cloud itself by assigning each piece of metadata a score, and allowing the metadata to be inserted into the tag cloud based on the score, as described above. In some embodiments, the metadata itself can be presented in a second separate tag cloud.

In a further alternative embodiment, the summary can be rendered as a thumbnail image. This thumbnail image can incorporate the summary tag cloud, the summary sentences, or both. In cases where images are part of or exist in the document itself, these images can be miniaturized and incorporated into the thumbnail as well. One advantage of such a thumbnail is that it would be usable at a smaller size and/or lower screen resolution than the summary described above.

In a further alternative embodiment, a Markov model and Markov sentence generator (MSG) can be used to create summary sentences of documents. A Markov model is a probabilistic model of a process that can rely on the property that future states of the process depend only on present states. Using a Markov model or a hidden Markov model enables simulation of complex processes, like generation of sentences, with reduced computational complexity. For example, a Markov model can be trained using a document as input, and the Markov model can transform the sentences into chains of two or more words. Subsequently, when the first of a chain of two or more words is encountered, a sentence generator can output the second word of the chain. It is acknowledged that a Markov sentence generator will not necessarily generate sentences that are meaningful to human readers, but they may nevertheless provide some useful information.

An MSG can be trained on a single pass through the document and can then generate nonsense sentences that look as though they may have come from the source document. Such a summary could be useful for getting a feel for what a document is about. The MSG would be presented in addition to the noun tag cloud, in some embodiments, or in addition to both the noun tag cloud and the extracted summary sentences, in some embodiments. A sample MSG generated from Moby Dick follows: "An eternally progressive progeny of griefs beneath the boat somehow and somewhere else the congealed frost lay ten inches of the boats. Steadily pulling or sailing or paddling after the late Captain EZEKIEL, hardy who in this tropic whaling life a sublime uneventfulness invests you. You cannibal if you try to enlarge The circle of the sperm Whale was esteemed a rare dish were It a great chest of drawers in your jolly-boat your noble conceptions of him nor does it seem any argument in favour of the same instant not the less man has lost that fin in swimming as to attempt weighing A Dutch barn in jewellers' scales." While this sentence does not clearly indicate what Moby Dick is about, the specific usage and language in the MSG suggests that Moby Dick is a nineteenth-century novel about the ocean.

Other embodiments are within the scope and spirit of the invention(s).

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory, a random access memory, and/or any other non-transitory computer readable medium. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

What is claimed is:

1. A computerized method for providing a summary of a text document, comprising:
    identifying at least some nouns and sentences in the text document;
    for at least some of the identified nouns, counting the number of times the identified nouns appear in the text document;
    identifying a predetermined number of most-prevalent nouns based on the number of times the identified nouns appear in the text document;
    scoring each of the identified sentences as a function of the number of times the predetermined number of most-prevalent nouns occurs therein;
    displaying at least some of the predetermined number of most-prevalent nouns, wherein the size of each displayed noun is a function of the number of times the displayed noun appears in the text document;
    displaying a predetermined number of the scored sentences that have the highest scores, the displayed scored sentences being displayed in proximity to the displayed nouns; and
    discarding identified sentences that contain fewer words than a minimum word threshold.

2. The computerized method of claim 1, the scoring scheme further comprising:
    for a given sentence, locating each of the identified nouns that are in the sentence;
    for each located noun, identifying a score value to be added;
    adding each of the score values for each time each located noun is in the sentence to the score for the sentence; and
    dividing the score by the average number of words of all sentences in the text document, thereby normalizing the score over differing sentence lengths.

3. The computerized method of claim 1, wherein three scored sentences and nine identified nouns are displayed in the displayed nouns and the displayed sentences.

4. The computerized method of claim 1, wherein the minimum word threshold is six words.

5. The computerized method of claim 1, further comprising sending the displayed nouns and the displayed sentences to a mobile Internet device.

6. The computerized method of claim 1, further comprising displaying the displayed nouns in a tag cloud.

7. The computerized method of claim 1, further comprising placing the most-prevalent noun in the center of a tag cloud.

8. The computerized method of claim 1, further comprising using case-insensitivity and stemming to identify the nouns and sentences.

9. The computerized method of claim 1, wherein the predetermined number of scored sentences to be displayed and the predetermined number of most-prevalent nouns to be displayed are configurable.

10. A computing system comprising:
a processor; and
a memory coupled to the processor and including computer-readable instructions that, when executed by the processor, cause the processor to:
identify at least some nouns and sentences in the text document;
for at least some of the identified nouns, count the number of times the identified nouns appear in the text document;
identify a predetermined number of most-prevalent nouns based on the number of times the identified nouns appear in the text document;
score each of the identified sentences as a function of the number of times the predetermined number of most-prevalent nouns occurs therein;
display at least some of the predetermined number of most-prevalent nouns, wherein the size of each displayed noun is a function of the number of times the displayed noun appears in the text document;
display a predetermined number of the scored sentences that have the highest scores, the displayed scored sentences being displayed in proximity to the displayed nouns; and
discard identified sentences that contain fewer words than a minimum word threshold.

11. The computing system of claim 10, wherein three scored sentences and nine identified nouns are displayed in the displayed nouns and the displayed sentences.

12. The computing system of claim 10, further comprising computer-readable instructions that, when executed by the processor, cause the processor to:
for a given sentence, locate each of the identified nouns that are in the sentence;
for each located noun, identify a score value to be added;
add each of the score values for each time each located noun is in the sentence to the score for the sentence; and
divide the score by the average number of words of all sentences in the text document, thereby normalizing the score over differing sentence lengths.

13. The computing system of claim 10, wherein the predetermined number of scored sentences to be displayed and the predetermined number of most-prevalent nouns to be displayed are configurable.

14. The computing system of claim 10, wherein the minimum word threshold is six words.

15. The computing system of claim 10, further comprising a mobile Internet device for displaying the displayed nouns and the displayed sentences.

16. The computing system of claim 10, further comprising computer-readable instructions that, when executed by the processor, cause the processor to display the displayed nouns in a tag cloud.

17. The computing system of claim 10, further comprising computer-readable instructions that, when executed by the processor, cause the processor to display the most-prevalent noun in the center of a tag cloud.

18. The computing system of claim 10, further comprising computer-readable instructions that, when executed by the processor, cause the processor to use case-insensitivity and stemming to identify the nouns and sentences.

* * * * *